US006896424B2

(12) United States Patent
Hara et al.

(10) Patent No.: US 6,896,424 B2
(45) Date of Patent: May 24, 2005

(54) PACKAGING FOR ROLLED PHOTOSENSITIVE MATERIAL

(75) Inventors: Yoshio Hara, Kanagawa (JP); Makoto Kawamura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 58 days.

(21) Appl. No.: 10/668,230

(22) Filed: Sep. 24, 2003

(65) Prior Publication Data

US 2004/0081453 A1 Apr. 29, 2004

(30) Foreign Application Priority Data

Sep. 27, 2002 (JP) ....................................... 2002-284386

(51) Int. Cl.[7] ................................................ G03B 17/26

(52) U.S. Cl. ........................ 396/511; 396/517; 206/397

(58) Field of Search ................................ 396/511, 517; 206/389, 408, 413, 415, 416

(56) References Cited

U.S. PATENT DOCUMENTS 2,853,185 A * 9/1958 Rollie ........................ 206/407
4,208,790 A * 6/1980 Eglinton ...................... 29/798
5,275,346 A * 1/1994 Dominesey et al. ..... 242/348.4
5,655,659 A 8/1997 Kennedy
6,375,008 B2 4/2002 Shigeta et al.

FOREIGN PATENT DOCUMENTS

EP 0 982 625 A1 3/2000
EP 1 132 769 A2 9/2001
WO WO 97/04358 A1 2/1997

* cited by examiner

*Primary Examiner*—David M. Gray
(74) *Attorney, Agent, or Firm*—Sughrue Mion, PLLC

(57) ABSTRACT

In order to provide a packaging for a rolled photosensitive material, in which a rolled photosensitive material packaging body is accommodated in a container in a state in which the rolled photosensitive material packaging body is suspended, which, even if an outside diameter of an insert shaft of a supporting body changes due to shaping failure or change of size of the rolled photosensitive material, enables to cope with this change, protruding pieces which protrude substantially toward a center of an opening in which the insert shaft is inserted are provided at circumference of the opening of the supporting body, an inside diameter of the opening is larger than an outside diameter of the insert shaft and an inside diameter of a circle formed by connecting tip ends of the protruding pieces is smaller than the outside diameter of the insert shaft.

18 Claims, 5 Drawing Sheets

PACKAGING FOR ROLLED PHOTOSENSITIVE MATERIAL

CROSS-REFERENCE TO RELATED APPLICATION

This application claims priority under 35 USC 119 from Japanese Patent Application No. 2002-284386, the disclosure of which is incorporated by reference herein.

BACKGROUND OF THE INVENTION

1. Field of the Invention

The present invention relates to a packaging for a rolled photosensitive material, and particularly relates to a packaging in which a rolled photosensitive material packaging body is accommodated in a container in a suspended state.

2. Description of the Related Art

Conventionally, a rolled photosensitive material packaging body has been proposed in which: a leader for shielding light is connected to a tip end portion of a rolled photosensitive material which is rolled around a core to both ends of which light shielding flanges are attached, the leader for shielding light having a width which is larger than a distance between outer surfaces of the light shielding flanges, and comprising a light shielding plastic sheet having thermal contraction characteristic; the leader for shielding light is rolled around the core (rolled photosensitive material) once or more; the leader for shielding light is contracted by heat, thereby both end portions of the leader for shielding light tight-contact at least portions of the outer surfaces of the light shielding flanges (see Japanese Patent Application Laid-Open (JP-A) No. 2001-42478 (U.S. Pat No. 6,375,008 B2)).

Further, a packaging has been proposed in which the rolled photosensitive material packaging body is accommodated in a corrugated fibreboard container such that the rolled photosensitive material packaging body is supported in a suspended state by supporting bodies of the rolled photosensitive material packaging body. The supporting bodies which support the rolled photosensitive material packaging body in a suspended state each comprises a supporting portion having an opening and an insert-shaft which is inserted in the opening and fixed. The rolled photosensitive material packaging body is supported in a suspended state by the insert shafts being inserted in a cylinder portion of the rolled photosensitive material packaging body. Strength of the supporting portion of the supporting body in such packaging is high, and manufacture cost of the supporting body is low.

However, in such supporting body, because the insert shaft is inserted in (penetrated) the opening of the supporting portion and is fixed to the supporting portion by being engaged with a circumference of the opening, it is preferable that an outer diameter of the insert shaft is slightly larger than an inner diameter of the opening. In a case in which the outer diameter of the insert shaft is smaller than the inner diameter of the opening, problems arises in which fit-force is not obtained thereby the insert shaft may be easily off from the supporting portion at a time of manufacturing and/or it is not possible to maintain a state in which the rolled photosensitive material packaging body is suspended in a container at a time of physical distribution. On the other hand, in a case in which the outer diameter of the insert shaft is larger than the inner diameter of the opening, a problem arise in which the insert shaft cannot be inserted in the opening. That is, there is a problem in which frequency of arising the above mentioned problems becomes high even if shaping accuracy for the insert shaft decreases a little.

Further, in a case in which a size of the rolled photosensitive material is changed, it is necessary that an inner diameter of the cylinder portion of the packaging body is also changed. As a result, it is necessary to change the outer diameter of the insert shaft of the supporting body, and further, it is necessary to change the inner diameter of the opening of the supporting portion, which corresponds to the outer diameter of the insert shaft. That is, at the present state, it is necessary that parts of each type of the supporting body are designed in accordance with respective sizes of the rolled photosensitive material. Therefore, each time the packaging body is changed, it is necessary to make parts of the supporting body in accordance with this changing.

In a point of view of manufacturing, it is not preferable that the outer diameter of the insert shaft is shaped in high shaping accuracy, or every time the outer diameter of the insert shaft is changed, parts corresponding to this changing are made, because the cost increases. On the other hand, in order that the rolled photosensitive material packaging body is packaged in a suspended manner, a relationship between the outer diameter of the insert shaft and the inner diameter of the opening of the supporting portion is especially important in a point of view of ensuring the strength and manufacturing

SUMMARY OF THE INVENTION

In view of the aforementioned circumstances, in order to solve the above mentioned problems, an object of the present invention is to provide a packaging for a rolled photosensitive material, a rolled photosensitive material packaging body being accommodated in a container in a state in which the rolled photosensitive material packaging body is suspended, which, even if an outside diameter of an insert shaft of a supporting portion of a supporting body, for supporting the rolled photosensitive material packaging body in the container in a state in which the rolled photosensitive material packaging body is suspended, changes due to shaping failure or change of size of the rolled photosensitive material, includes an opening, for supporting the insert shaft, of the supporting portion of the supporting body, enabling to correspond to this change of the outside diameter of the insert shaft with a one type of configuration of the opening, thereby low cost packaging for a rolled photosensitive material can be provided.

A first aspect of the present invention is a packaging for a rolled photosensitive material using a container in which a rolled photosensitive material packaging body including the rolled photosensitive material is accommodated and supporting bodies, each comprising a supporting portion having an opening formed therein and an insert shaft inserted in the opening, for supporting the rolled photosensitive material packaging body in the container in a state in which the rolled photosensitive material packaging body is suspended in the container, by the insert shafts of the supporting bodies being inserted in a cylinder portion of the rolled photosensitive material packaging body, wherein a plurality of protruding pieces which protrude substantially toward a center of the opening are provided at a circumference of the opening of the supporting portion, an inside diameter of the opening is larger than an outside diameter of the insert shaft, and a diameter of a circle formed by connecting tip ends of the protruding pieces is smaller than the outside diameter of the insert shaft.

In a second aspect of the present invention according to the first aspect, the plurality of protruding pieces are formed at the circumference of the opening such that the opening has a wave-configuration in a plan view.

In a third aspect of the present invention according to the first aspect, the plurality of protruding pieces are formed at the circumference of the opening such that the opening has a gear-configuration in a plan view.

In a fourth, fifth and sixth aspects of the present invention according to the first, second and the third aspects, the supporting portion is formed from two sheets of corrugated fiberboard, each of whose corrugating medium runs in a direction of a diagonal line of the sheet, attached to each other such that the corrugating mediums of the two sheets are perpendicular to each other.

In a seventh aspect of the present invention according to the first aspect, at least three of the protruding pieces are formed at the circumference of the opening with substantially equal intervals therebetween.

In an eighth aspect of the present invention according to the first aspect, the insert shaft is engaged with the opening by the plurality of the protruding pieces being elastically deformed by the insert shaft when the insert shaft is inserted in the opening.

In a ninth aspect of the present invention according to the first aspect, the supporting portion is formed by folding and piling up a sheet of corrugated fiberboard.

In a tenth aspect of the present invention according to the first aspect, the supporting portion is formed, together with the opening and the plurality of the protruding pieces thereof, by carrying out punching at the same time.

In an eleventh aspect of the present invention according to the first aspect, the rolled photosensitive material packaging body comprises the rolled photosensitive material, light shielding flanges which cover both ends of the rolled photosensitive material, and a light shielding leader which covers a peripheral surface of the rolled photosensitive material.

A twelfth second aspect of the present invention is a packaging for a rolled photosensitive material using: a container in which a rolled photosensitive material packaging body including the rolled photosensitive material is accommodated; and supporting bodies, each comprising a supporting portion having an opening formed therein and an insert shaft inserted in the opening, for supporting the rolled photosensitive material packaging body in the container in a state in which the rolled photosensitive material packaging body is suspended in the container, by the insert shafts of the supporting bodies being inserted in a cylinder portion of the rolled photosensitive material packaging body, wherein at least three protruding pieces which protrude substantially toward a center of the opening are provided at a circumference of the opening of the supporting portion, an inside diameter of the opening is larger than an outside diameter of the insert shaft, a diameter of a circle formed by connecting tip ends of the protruding pieces is smaller than the outside diameter of the insert shaft, and the insert shaft is engaged with the opening by the plurality of the protruding pieces being elastically deformed by the insert shaft when the insert shaft is inserted in the opening.

In the packaging for a rolled photosensitive material of the present invention, the protruding pieces which protrude substantially toward the center of the opening are provided at the circumference of the opening of the supporting portion of the supporting body which supports the rolled photosensitive material packaging body in the container in a state in which the rolled photosensitive material packaging body is suspended. The inside diameter of the opening is larger than the outside diameter of the insert shaft and the inside diameter of the circle formed by connecting tip ends of the protruding pieces provided at the circumference of the opening is smaller than the outside diameter of the insert shaft. Therefore, even in a case in which a size of the insert shaft is changed, as long as the outside diameter of the insert shaft satisfies the above mentioned relationship, the protruding pieces provided at the opening are engaged with the insert shaft by being elastically deformed by a peripheral surface of the insert shaft when the insert shaft is inserted in the opening of the supporting portion. Thereby the insert shaft is supported and fixed to the opening. Therefore, even if the outside diameter of the insert shaft of the supporting body, for supporting the rolled photosensitive material packaging body in the container in a state in which the rolled photosensitive material packaging body is suspended, changes due to shaping failure or change of size of the rolled photosensitive material, the insert shaft can be supported and fixed to the opening whose configuration is unified (standardized) so as to have single type of configuration.

DETAILED DESCRIPTION OF THE INVENTION

Figure 1:
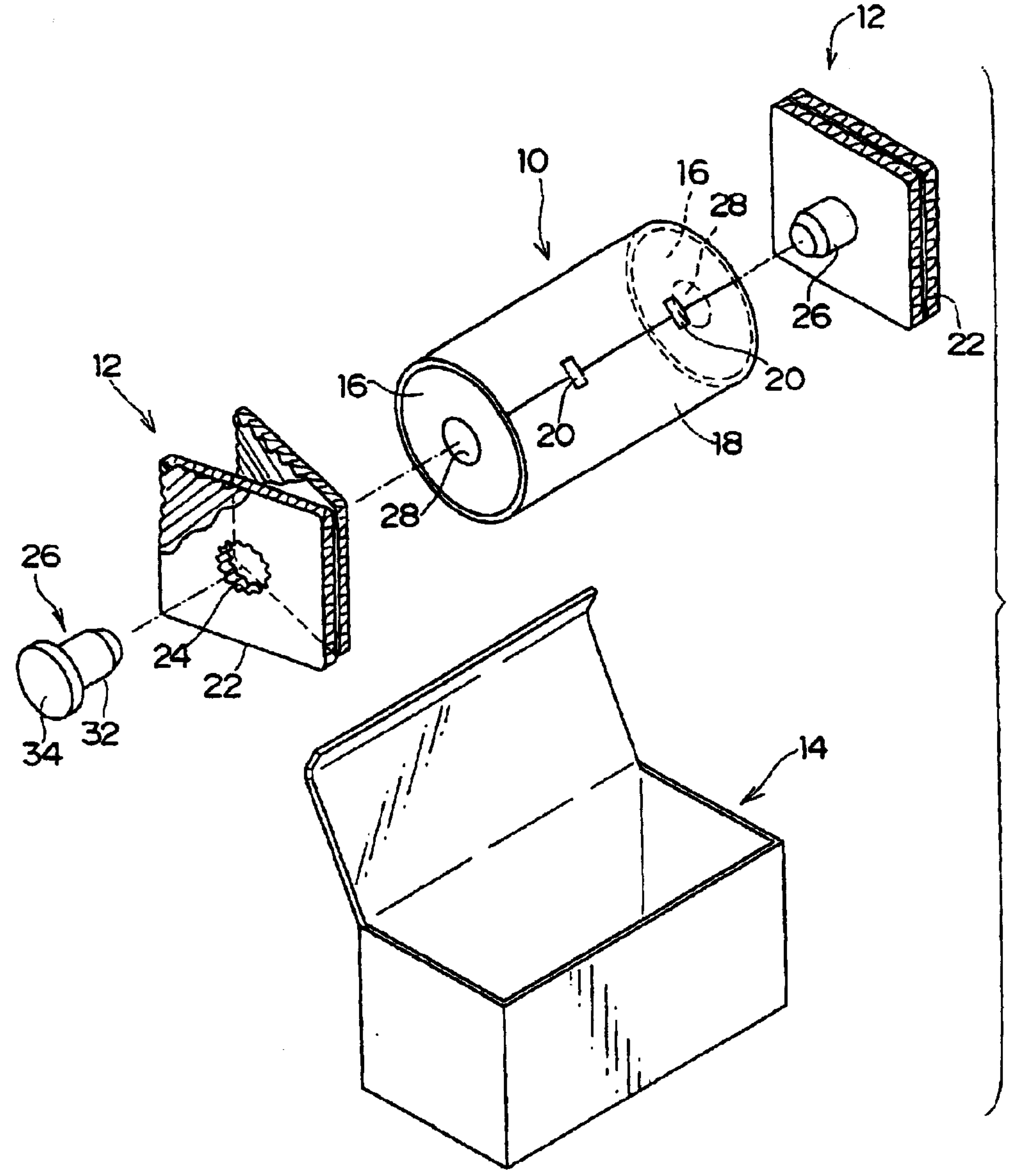
FIG. 1 is an exploded perspective view showing a packaging of a rolled photosensitive material relating to an embodiment of the present invention.

Referring to drawings, embodiments of the present invention will be described hereinafter in detail. Note that the same reference numerals are applied to the same components, members and structures having substantially the same functions in the drawings and the descriptions thereof may be omitted.

Figure 2:
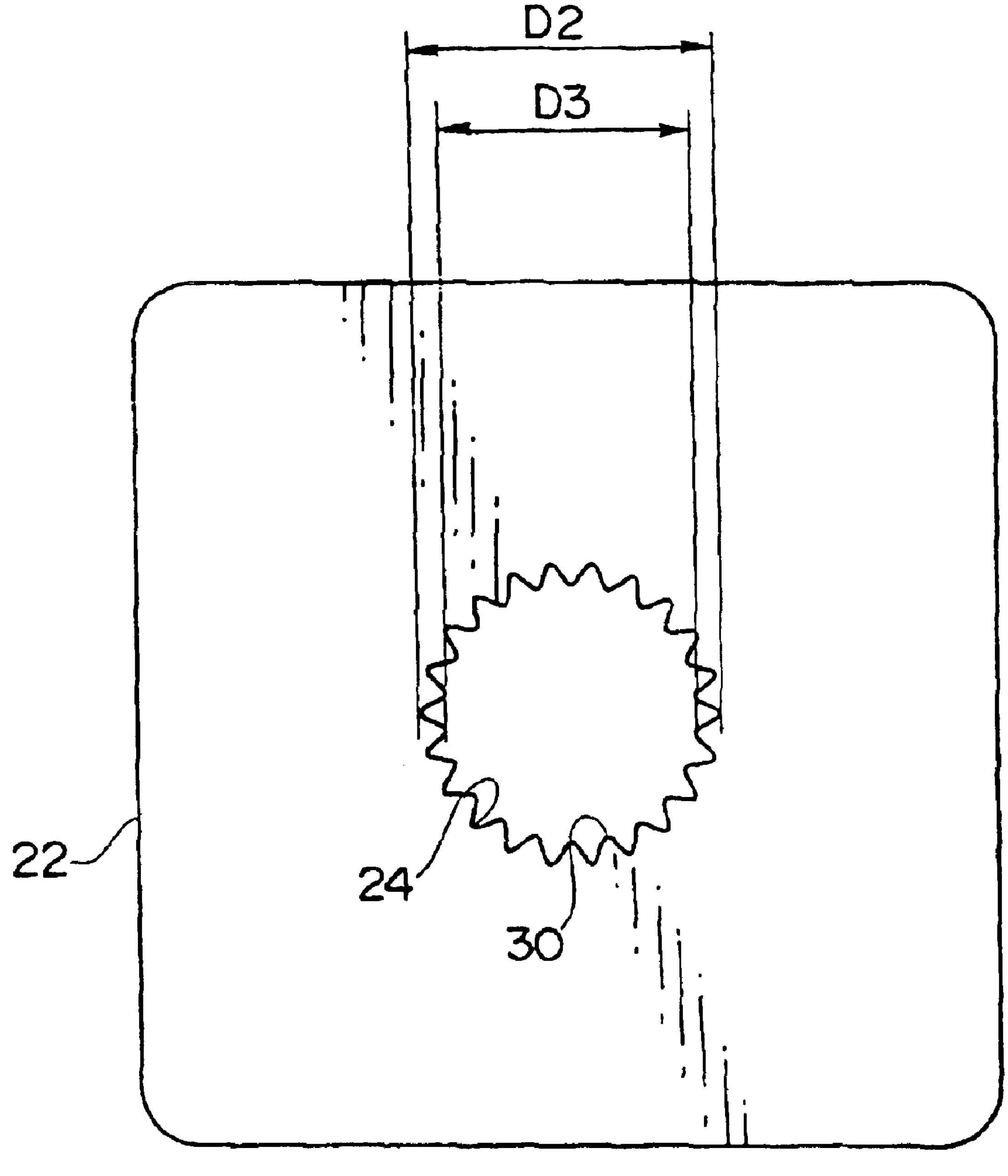
FIG. 2 is a plan view showing a supporting portion of a supporting body used in the packaging of the rolled photosensitive material relating to the embodiment of the present invention.

FIG. 1 is an exploded perspective view showing packaging of a rolled photosensitive material relating to an embodiment of the present invention. FIG. 2 is a plan view showing a supporting portion of a supporting body used in the packaging of the rolled photosensitive material relating to the embodiment of the present invention.

In the packaging of the rolled photosensitive material shown in FIG. 1, a rolled photosensitive material packaging body 10 is supported in a suspended manner by means of the supporting bodies 12 and is accommodated in a corrugated fibreboard container 14 having a box shape.

The rolled photosensitive material packaging body 10 comprises, for example, a rolled photosensitive material (not shown in the drawings) in which a sheet shaped photosensitive material is rolled around a core, light shielding flanges 16 which cover both end sides of the rolled photosensitive material, and a light shielding leader 18 which covers peripheral surface of the rolled photosensitive material. The light shielding leader 18 is connected to a tip end portion of the photosensitive material, at which rolling of the photosensitive material is ended, by means of an adhesive tape or the like. The light shielding leader 18 is rolled around the photosensitive material, a terminal end portion of the light shielding leader 18, at which rolling is ended, is sealed by means of an adhesive tape or the like so as to cover the peripheral surface of the photosensitive material. Regarding this rolled photosensitive material packaging body 10, a rolled photosensitive material packaging body recited in Japanese Patent Application Laid-Open (JP-A) No. 2001-42478 can be preferably applied to the present invention.

The supporting body 12 comprises a supporting portion at which a circular opening 24 is provided, and an insert shaft 26 which is inserted in the opening 24. The rolled photosensitive material packaging body 10 is supported in the suspended manner and is accommodated in the corrugated fibreboard container 14 by that the insert shafts 26 of the supporting bodies 12 are inserted in a cylinder portion 28 of the rolled photosensitive material packaging body 10 (cylinder portions 28 of the light shielding flanges 16).

The supporting portion 22 is formed by two sheets of corrugated fibreboard (corrugated board) being attached (piled) to each other, that is, by overlaying one sheet of corrugated fibreboard on another sheet of corrugated fibreboard. Each corrugating medium of the two sheets of the corrugated fibreboard run in directions of diagonal lines of the respective sheets of the corrugated fibreboards, and the two sheets of the corrugated fibreboard are attached such that the corrugating mediums of the two sheets of the corrugated fibreboard are perpendicular. The strength of the supporting portion 22 is secured by this structure.

The supporting portion 22 can be made by two corrugated fibreboard sheets being attached. However, when considering a point of view of reduction of numbers of manufacturing processes and ensuring dimensional accuracy, it is preferable that the supporting portion 22 is made by: a single sheet of a corrugated fibreboard being formed by punching process; and then the single sheet of the corrugated fibreboard being subject to folding process. In a case in which the supporting portion 22 is made from the single sheet of the corrugated fibreboard, a fold-line (a rule line, a notching line or the like) is provided on the sheet of the corrugated fibreboard, the sheet of the corrugated fibreboard is folded at the fold-line to fold up two parts (which are divided by the fold line) of the sheet of the corrugated fibreboard such that corrugating mediums of the two parts of the sheet of the corrugated fibreboard become perpendicular.

The number of manufacturing processes can be reduced by that the openings 24 of the supporting portion 22 are formed at the same time by the punching process. Further, in this case, it is easy to secure the dimensional accuracy because positional relationship of the opening 24 with respect to an outline shape of the supporting portion 22 is determined by accuracy of a punching blade.

Any material of the corrugated fibreboard forming the supporting portion 22 can be used as long as the strength is secured (ensured). Accordingly, it is preferable to use, for example, the material of a sheet of a double wall corrugated fibreboard, such as a AB double flute. The detailed explanations for the corrugated fibreboard are described in pages 296–309 of Packaging Technology Handbook (Japan Packaging Institute, issued on Jul. 1, 1995).

The supporting portion 22 is made, for example, by that: a sheet of the corrugated fibreboard, which is a double wall corrugated fibreboard of linerboard 280 g/$m^2$ and corrugating medium 280 g/$m^2$ is used; a rectangle whose dimension is 168 mm×336 mm is formed by punching such that the corrugating medium has an angle of about 45 degree; at the same time, a notching line of half cut is formed at a central portion (a position of 168 mm) in a direction of a longitudinal side (336 mm); the sheet of the corrugated fibreboard is folded at the central portion (along the notching line); two parts (which are divided by the notching line) are fixed to each other by an adhesive. Thus, the supporting portion 22 having two layers of the corrugated fibreboard attached to each other, whose corrugating mediums are perpendicular and whose side is 168 mm, is manufactured.

Figure 3A:
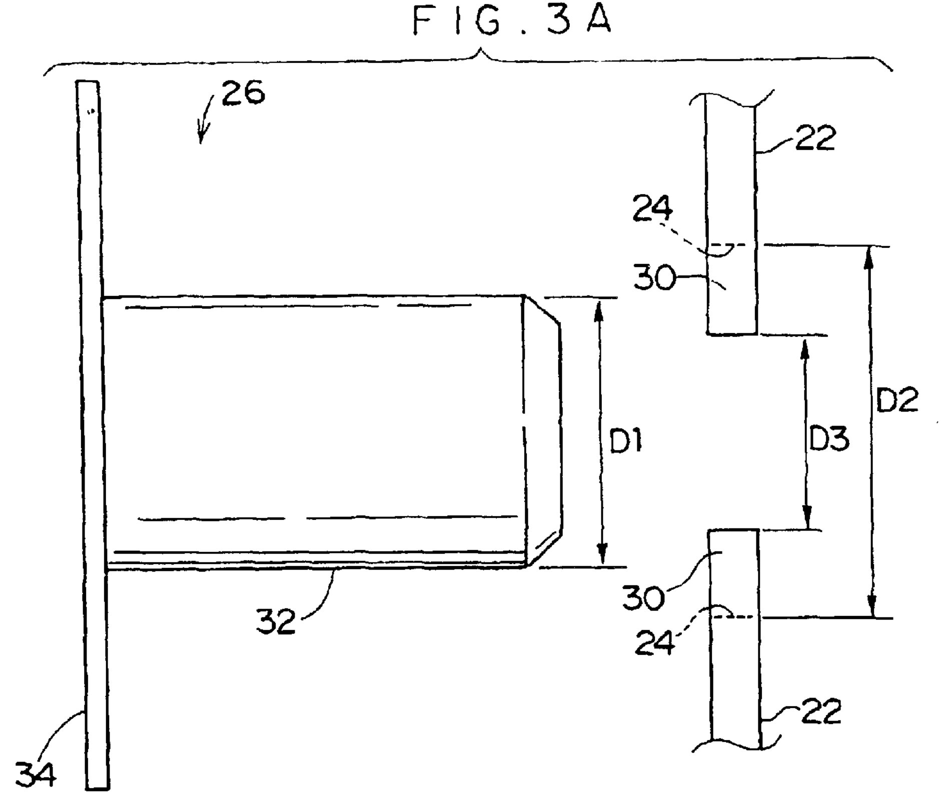
FIG. 3A is an explaining view for explaining insertion of an insert shaft into an opening of the supporting portion of the supporting body.
Figure 3B:
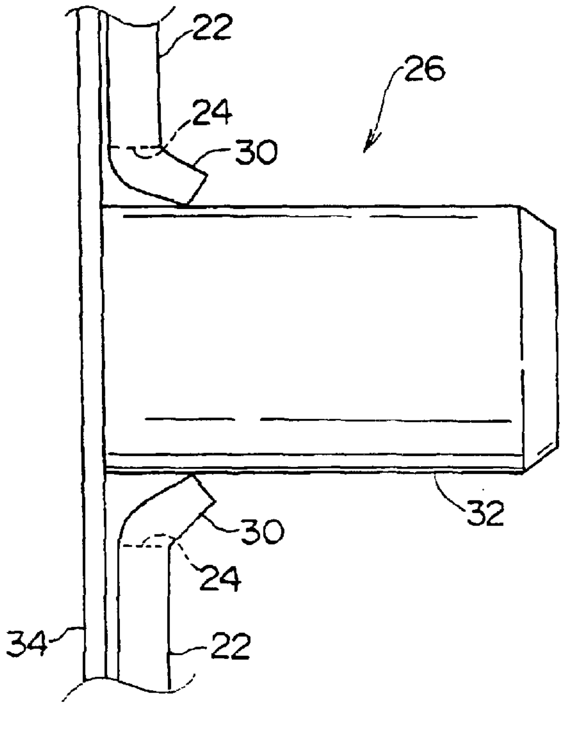
FIG. 3B is an explaining view for explaining insertion of an insert shaft into an opening of the supporting portion of the supporting body.

As shown in FIG. 2, the opening 24 of the supporting portion 22 is provided at the almost central position of the supporting portion 22. A plurality of protruding pieces 30, which protrude toward substantially a center of the opining 24, are provided at a circumference of the opening 24. Each of the protruding pieces 30 are formed such that the opening 24 has a wave-circular configuration in a plan view. As shown in FIGS. 2 and 3A, an inner diameter D2 of the opening 24 (in the present embodiment, the inner diameter D2 is a diameter of a circle which is formed by connecting base ends of the plurality of the protruding pieces 30) is larger than an outer diameter D1 of the insert shaft 26. In addition, an inner diameter D3 (in the present embodiment, the inner diameter D3 is a diameter of a circle which is formed by connecting tip ends of the plurality of the protruding pieces 30) is smaller than the outer diameter D1 of the insert shaft 26. That is, the relationship among D1, D2, D3 is as follows "a minimum diameter D3<the outer diameter D1 of the insert shaft 26<a maximum diameter D3". As shown in FIG. 3B, when the insert shaft 26 is inserted in the opening 24 of the supporting portion 22, the protruding pieces 30 are elastically deformed by a peripheral surface of the insert shaft 26 to engage with the insert shaft 26. Thus, the insert shaft 26 is supported and fixed.

As a result, for example, even in a case in which there are insert shafts whose outer diameters are different due to difference of sizes of rolled photosensitive materials, as long as the outer diameters D1 of the insert shafts satisfy the above mentioned relationship with respect to the inner diameter D2 of the opening 24 and the inner diameter D3 of the circle which is formed by connecting the tip ends of the protruding pieces 30, the insert shafts 26 of different outer diameters can be engaged with the opening 24 by the protruding pieces 30 even if the configuration of the opening 24 (including the protruding pieces 30) of the supporting portion 22 is unified (standardized) so as to have single type of configuration. Thus, the function in which the rolled photosensitive material packaging body 10 is suspended can be fulfilled. Further, even if the outer diameter of the insert shaft 26 is different from the standard outer diameter due to failure shaping or the like, the function in which the rolled photosensitive material packaging body 10 is suspended can be fulfilled in the similar way if the outer diameter of the insert shaft 26 satisfy the above mentioned relationship.

Concretely, for example, in a case in which the supporting portion 22 is subject to punching process such that the inner diameter D2 of the opening 24 is 53 mm and the inner diameter D3 of the circle which is formed by connecting the tip ends of the protruding pieces 30 is 47 mm, even if there are two types of the insert shafts 26 whose outer diameters are 48.6 mm and 49.9 mm (that is, the difference between the outer diameters of the two types of the insert shafts 26 is 1.3 mm), the engagement between the opening 24 (including the protruding pieces 30) of the supporting portion 22, whose configuration is unified to one type, and each of the two types of the insert shafts 26 is sufficiently ensured by the protruding pieces 30.

Figure 4:
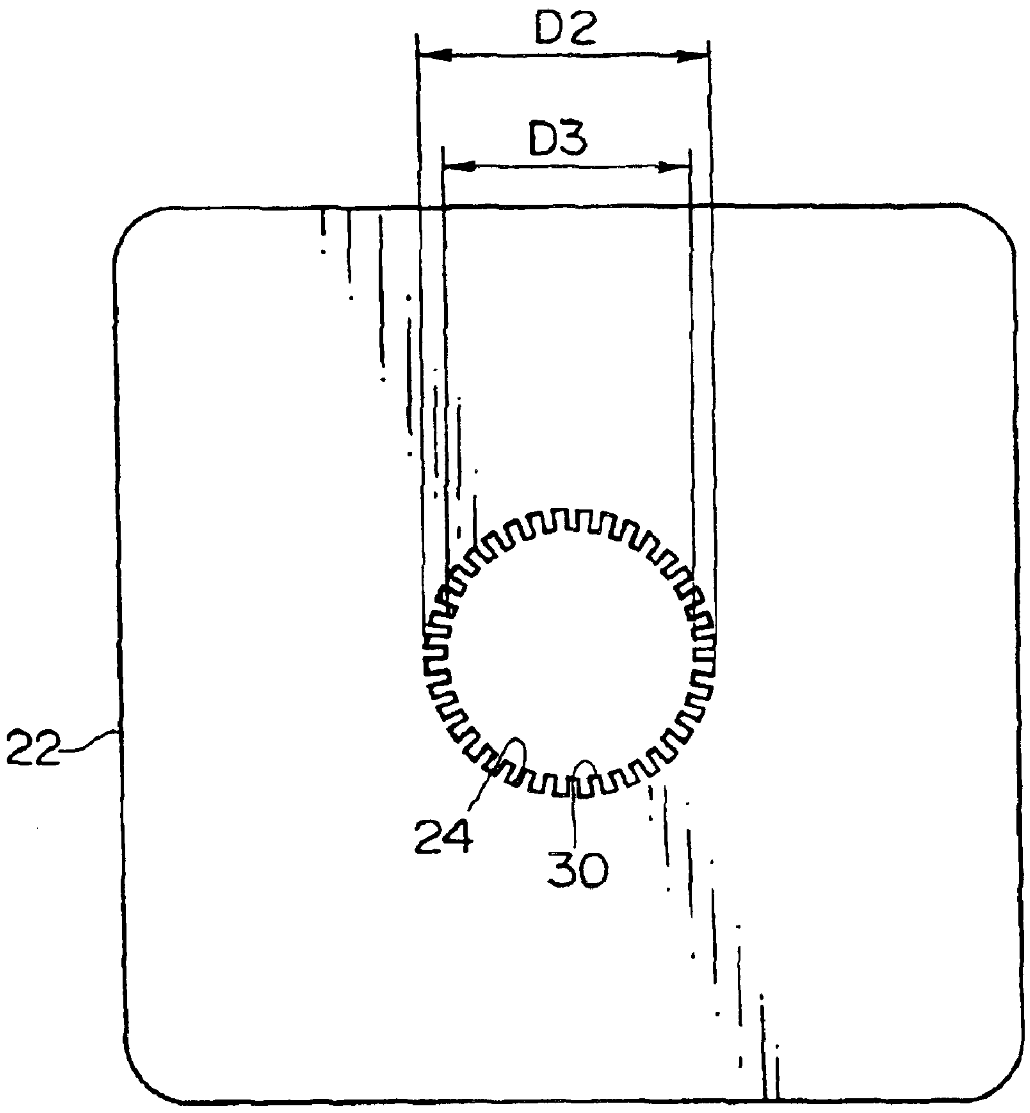
FIG. 4 is a plan view showing an another example of a supporting portion of the supporting body used in the packaging of the rolled photosensitive material relating to the embodiment of the present invention.
Figure 5:
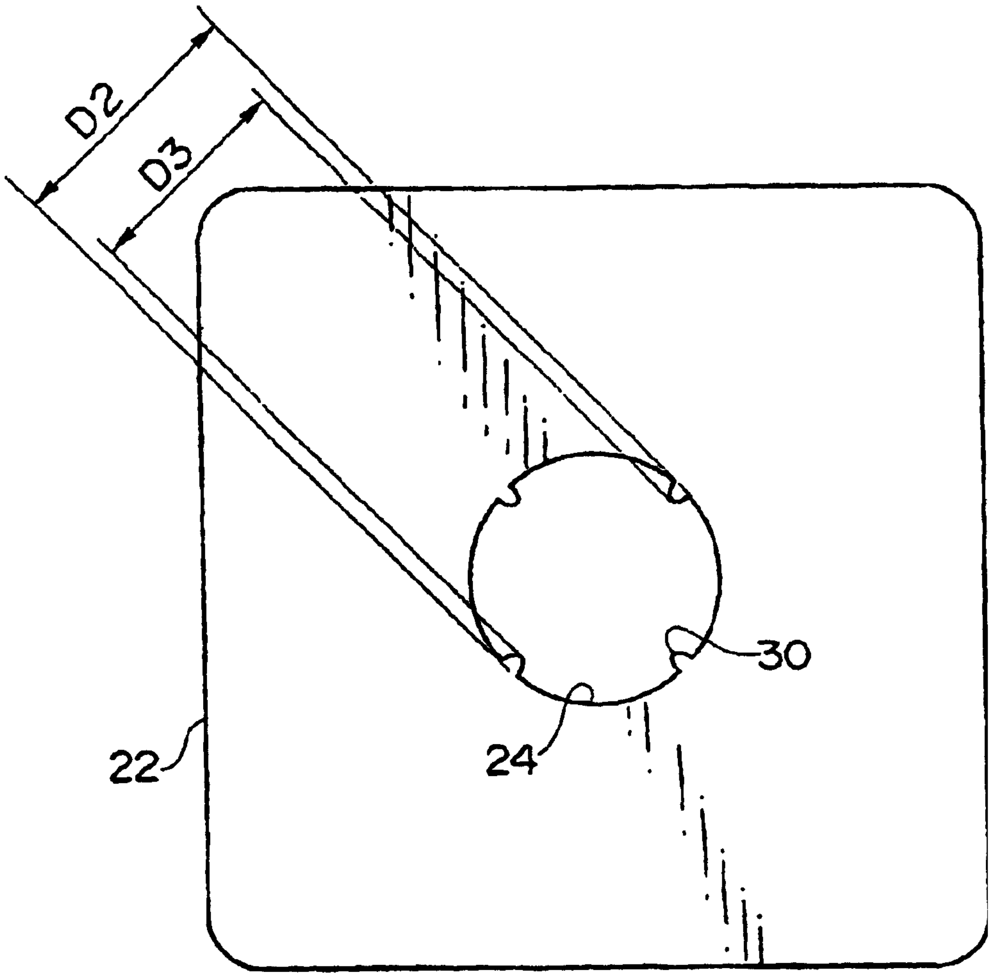
FIG. 5 is a plan view showing an another example of a supporting portion of the supporting body used in the packaging of the rolled photosensitive material relating to the embodiment of the present invention.

In the present invention, the protruding pieces 30 provided at the circumference of the opening 24 of the supporting portion 22 are not limited to the same. For example, as shown in FIG. 4, a plurality of protruding pieces 30, each of which is formed such that the opening 24 has a gear shape in a plan view, can be continuously formed at the opening 24. Also, as shown in FIG. 5, four protruding pieces 30 can be formed at equal spaces therebetween. In a point of view in which the insert shaft 26 is surely supported and fixed, it is preferable that the protruding pieces 30 of three or more are provided at equal spaces therebetween.

The opening 24 at which such protruding pieces 30 are provided can be easily formed by, for example, punching at a time of making the above mentioned supporting portion 22. That is, the opening 24 and the protruding pieces 30 are both formed at the same time.

The insert shaft 26 comprises a cylinder shaped core portion 32 and a disc flange portion 34. The flange portion 34 is formed at an one end of the core portion 32. Note that, in the present specification, "outer diameter of the insert shaft" means an outer diameter of the cylinder shaped core portion 32 inserted in the opening 24 of the supporting portion 22.

The core portion 32 is inserted in the opening 24 of the supporting portion 22. In addition, the core portion 32 is inserted in the cylinder portion 28 of the rolled photosensitive material packaging body 10 (the cylinder portion 28 of the light shielding flange 16). The insert shafts 26 have a function for maintaining a state in which the rolled photosensitive material packaging body 10 is suspended. In this state, the flange portion 34 of the insert shaft 26 abuts a surface of the supporting portion 22. It has a function for preventing deformation of the core portion 32 and moving (for example, axis-displacement) of the core portion 32.

The inset shaft 26 is made, for example, from a plastic material such as a thermal plasticity resin. The inset shaft 26, that is, the core portion 32 together with the flange portion, is integrally formed by injection molding. Many plastic material can be used, but a polypropylene resin is preferable as the plastic material in a point of view of the strength, productivity and cost. Concretely, for example, PP resin "BC-8" (Japan polychem Corporation) can be used.

In the present embodiment, a case has been explained in which the supporting portion 22 is formed from two sheets of corrugated fiberboards (two parts of corrugated fiberboards) which are attached to each other. A resin-coating layer or the like such as a polyethylene laminate-layer or the like is provided on a linerboard surface of the sheet of the corrugated fiberboard of the supporting portion 22 (for example, a polyethylene resin of 30 $\mu$m thickness is laminated on the linerboard surface) so as to prevent generation of paper dust. When the rolled photosensitive material packaging body 10, which is accommodated in the corrugated fibreboard container, is distributed (transported) in a state in which the rolled photosensitive material packaging body 10 is supported by the supporting portions 12 in a suspended manner, the light shielding flange 16 of the rolled photosensitive material packaging body 10 contacts a surface of the supporting body 12 (the supporting portion 22) for suspending, and the surface of the supporting body 12 is rubbed due to transportation-vibration at a time of physical distribution or the like, thereby there may be a case of generating of the paper dust. Therefore, it is preferable that the resin-coating layer or the like is provided on the linerboard surface of the sheet of the corrugated fiberboard of the supporting portion.

Further, in the present embodiment, the example has been explained in which the inset shaft 26 is made by injection molding with the plastic material such as the thermal plasticity resin or the like. When considering a point of view of recent environmental issue, it is possible to use a cellulose fiber resin mixture (also called a "paper resin", hereinafter, "paper resin") as the material of the insert shaft 26. The paper resin is a material in which: high accuracy-processing by the injection molding or the like is possible; quantity of heat at a time of combustion is low; and rigidity which is substantially the same as that of the above mentioned plastic material can be obtained. Concretely, the paper resin is made from a mixture of fiber and resin material. For example, a mixture including a cellulose fiber and a polyolefine resin is used, and component (proportion) ratio of the total of the polyolefine resin and another thermal plasticity resin with respect to the cellulose fiber is within range of 51:49~75:25 (weight ratio). In this case, because the resin paper as the material (composition material) of the insert shaft 26 and the sheet of the corrugated fiberboard as the material (composition material) of the supporting portion 22 are used in the supporting body, it is possible to provide packaging provided with waste disposal qualification.

The packaging for rolled photosensitive material relating to the above mentioned embodiments of the present invention has been explained. However, it is intended to cover all changes and modifications which fall within the scope of the invention. Further, the scope of the present invention is not limited to the embodiments and the examples described above.

In the present invention, in a packaging for a rolled photosensitive material in which a rolled photosensitive material packaging body is accommodated in a container in a state in which the rolled photosensitive material packaging body is suspended, even if an outside diameter of an insert shaft of a supporting body, for supporting the rolled photosensitive material packaging body in the container in a state in which the rolled photosensitive material packaging body is suspended, changes due to shaping failure or change of size of the rolled photosensitive material, an opening, for supporting the insert shaft, of the supporting body, enabling to cope with this change of the outside diameter of the insert shaft with a one type of configuration of the opening can be provided. Thereby, the supporting body can be made in a low cost. As a result, a low cost packaging for a rolled photosensitive material can be provided.

What is claimed is:

1. A packaging for a rolled photosensitive material using:

a container in which a rolled photosensitive material packaging body including the rolled photosensitive material is accommodated; and supporting bodies, each comprising a supporting portion having an opening formed therein and an insert shaft inserted in the opening, for supporting the rolled photosensitive material packaging body in the container in a state in which the rolled photosensitive material packaging body is suspended in the container, by the insert shafts of the supporting bodies being inserted in a cylinder portion of the rolled photosensitive material packaging body, wherein a plurality of protruding pieces which protrude substantially toward a center of the opening are provided at a circumference of the opening of the supporting portion, an inside diameter of the opening is larger than an outside diameter of the insert shaft, and a diameter of a circle formed by connecting tip ends of the protruding pieces is smaller than the outside diameter of the insert shaft.

2. A packaging for a rolled photosensitive material according to claim 1, wherein the plurality of protruding pieces are formed at the circumference of the opening such that the opening has a wave-configuration in a plan view.

3. A packaging for a rolled photosensitive material according to claim 1, wherein the plurality of protruding pieces are formed at the circumference of the opening such that the opening has a gear-configuration in a plan view.

4. A packaging for a rolled photosensitive material according to claim 1, wherein the supporting portion is formed from two sheets of corrugated fiberboard, each of whose corrugating medium runs in a direction of a diagonal line of the sheet, attached to each other such that the corrugating mediums of the two sheets are perpendicular to each other.

5. A packaging for a rolled photosensitive material according to claim 2, wherein the supporting portion is formed from two sheets of corrugated fiberboard, each of whose corrugating medium runs in a direction of a diagonal line of the sheet, attached to each other such that the corrugating mediums of the two sheets are perpendicular to each other.

6. A packaging for a rolled photosensitive material according to claim 3, wherein the supporting portion is formed from two sheets of corrugated fiberboard, each of whose corrugating medium runs in a direction of a diagonal line of the sheet, attached to each other such that the corrugating mediums of the two sheets are perpendicular to each other.

7. A packaging for a rolled photosensitive material according to claim 1, wherein at least three of the protruding pieces are formed at the circumference of the opening with substantially equal intervals therebetween.

8. A packaging for a rolled photosensitive material according to claim 1, wherein the insert shaft is engaged with the opening by the plurality of the protruding pieces being elastically deformed by the insert shaft when the insert shaft is inserted in the opening.

9. A packaging for a rolled photosensitive material according to claim 1, wherein the supporting portion is formed by folding and piling up a sheet of corrugated fiberboard.

10. A packaging for a rolled photosensitive material according to claim 1, wherein the supporting portion is formed, together with the opening and the plurality of the protruding pieces thereof, by carrying out punching at the same time.

11. A packaging for a rolled photosensitive material according to claim 1, wherein the rolled photosensitive material packaging body comprises the rolled photosensitive material, light shielding flanges which cover both ends of the rolled photosensitive material, and a light shielding leader which covers a peripheral surface of the rolled photosensitive material.

12. A packaging for a rolled photosensitive material using:

a container in which a rolled photosensitive material packaging body including the rolled photosensitive material is accommodated; and supporting bodies, each comprising a supporting portion having an opening formed therein and an insert shaft inserted in the opening, for supporting the rolled photosensitive material packaging body in the container in a state in which the rolled photosensitive material packaging body is suspended in the container, by the insert shafts of the supporting bodies being inserted in a cylinder portion of the rolled photosensitive material packaging body, wherein at least three protruding pieces which protrude substantially toward a center of the opening are provided at a circumference of the opening of the supporting portion, an inside diameter of the opening is larger than an outside diameter of the insert shaft, a diameter of a circle formed by connecting tip ends of the protruding pieces is smaller than the outside diameter of the insert shaft, and the insert shaft is engaged with the opening by the plurality of the protruding pieces being elastically deformed by the insert shaft when the insert shaft is inserted in the opening.

13. A packaging for a rolled photosensitive material according to claim 12, wherein the protruding pieces are formed at the circumference of the opening such that the opening has a wave-configuration in a plan view.

14. A packaging for a rolled photosensitive material according to claim 12, wherein the protruding pieces are formed at the circumference of the opening such that the opening has a gear-configuration in a plan view.

15. A packaging for a rolled photosensitive material according to claim 12, wherein the supporting portion is formed from two sheets of corrugated fiberboard, each of whose corrugating medium runs in a direction of a diagonal line of the sheet, attached to each other such that the corrugating mediums of the two sheets are perpendicular to each other.

16. A packaging for a rolled photosensitive material according to claim 12, wherein the supporting portion is formed by folding and piling up a sheet of corrugated fiberboard.

17. A packaging for a rolled photosensitive material according to claim 12, wherein the supporting portion is formed, together with the opening and the protruding pieces thereof, by carrying out punching at the same time.

18. A packaging for a rolled photosensitive material according to claim 12, wherein the rolled photosensitive material packaging body comprises the rolled photosensitive material, light shielding flange which covers both ends of the rolled photosensitive material, and a light shielding leader which covers a peripheral surface of the rolled photosensitive material.

* * * * *